Figure 1:
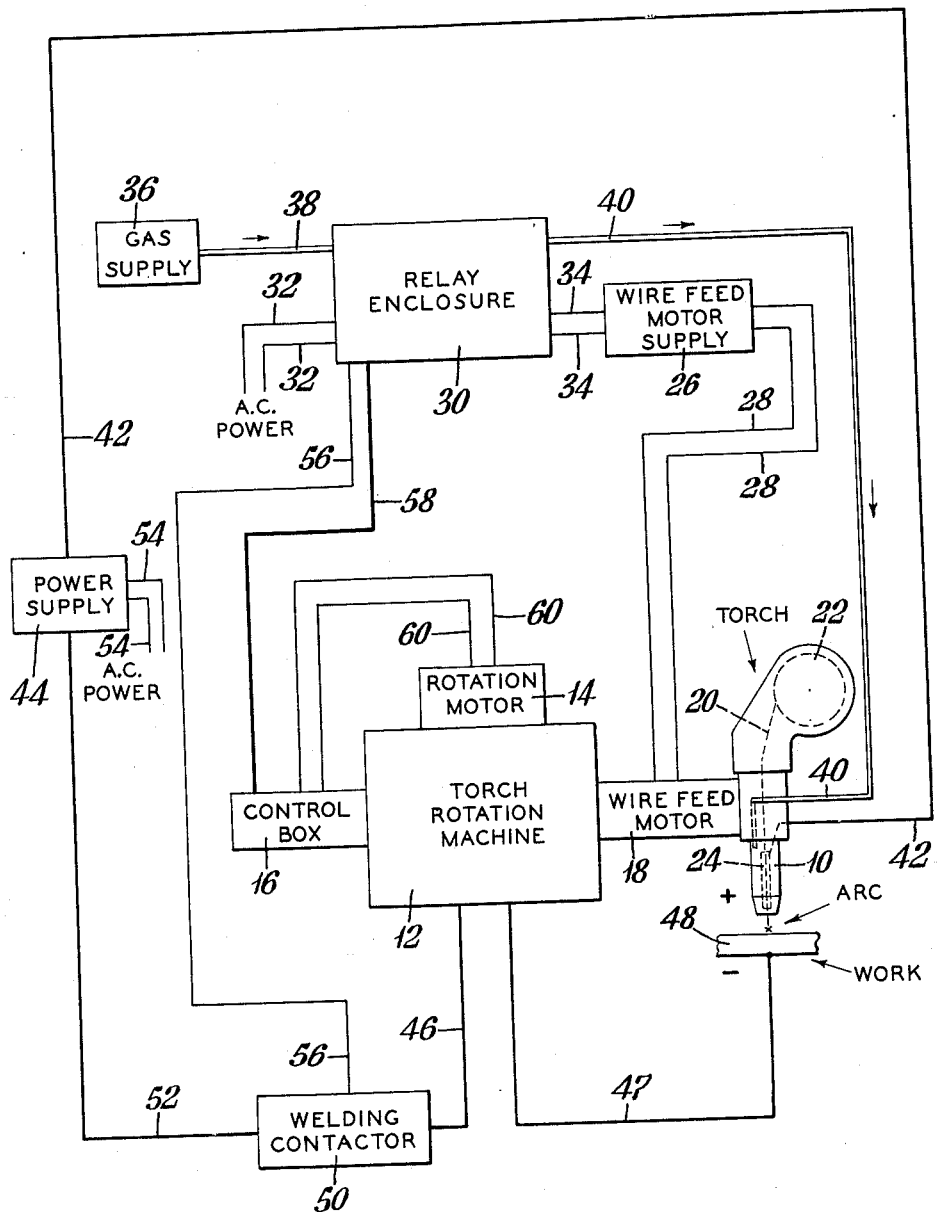

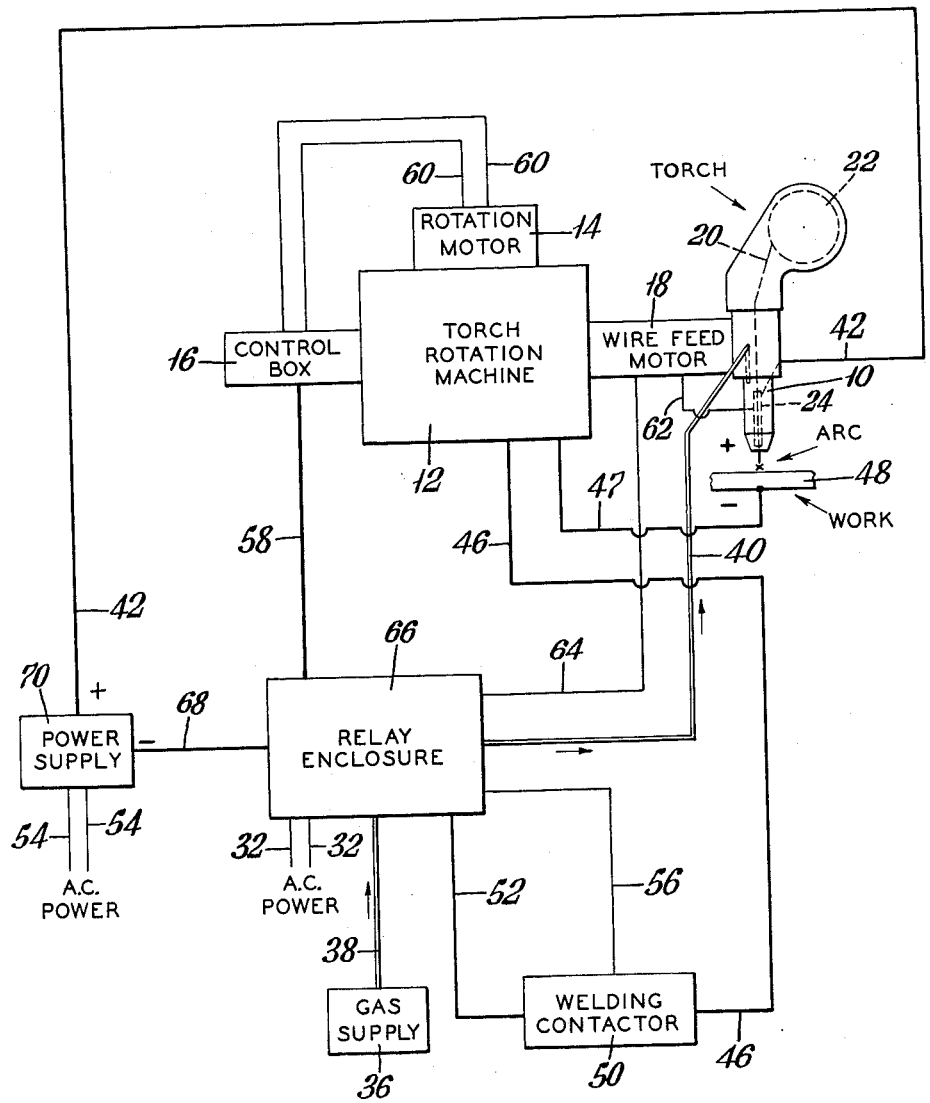

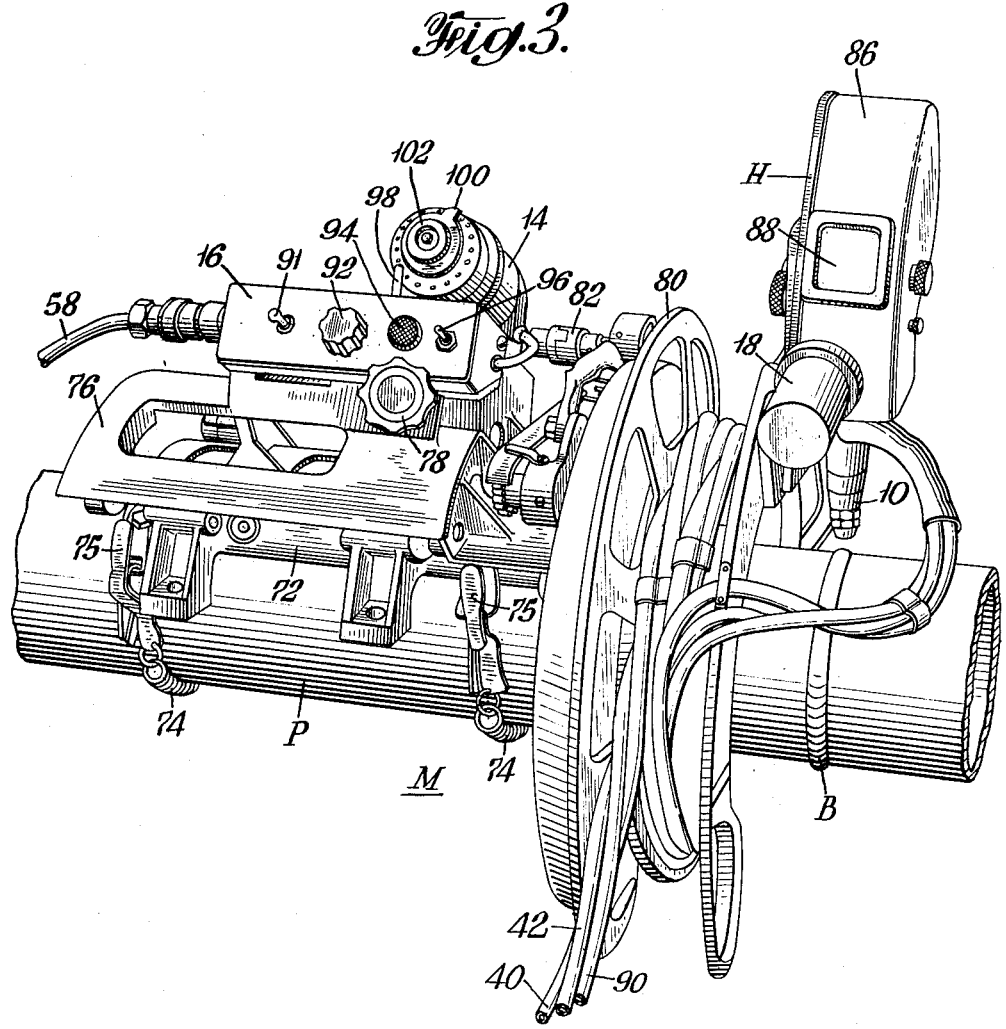

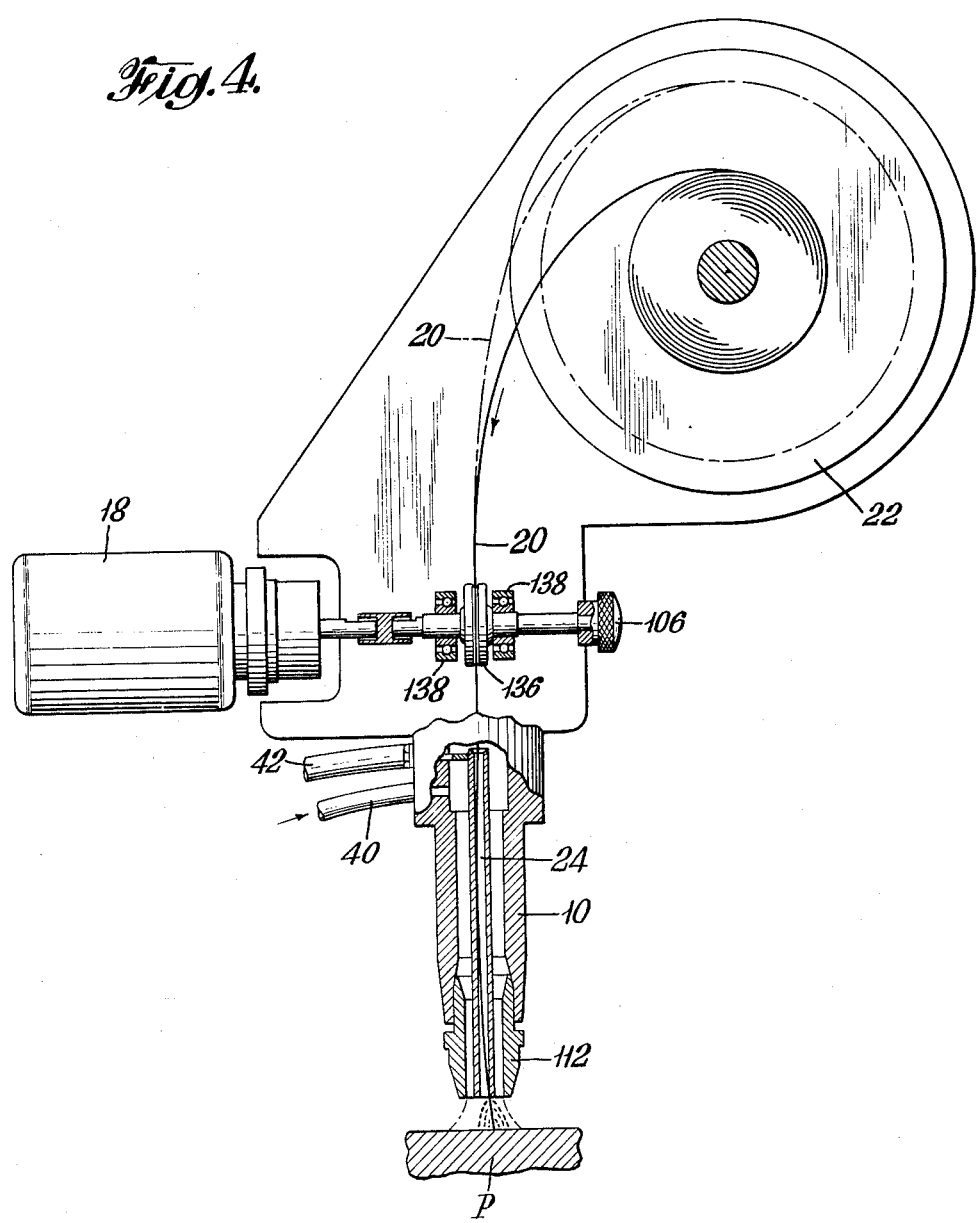

INVENTORS
JOHN W. ROSS
RONALD F. TURBITT

BY Barnwell R. King
ATTORNEY

April 30, 1963 J. W. ROSS ETAL 3,088,018
CONSUMABLE ELECTRODE ARC WELDING PROCESS AND APPARATUS
Filed Jan. 29, 1960 6 Sheets-Sheet 6

INVENTORS
JOHN W. ROSS
RONALD F. TURBITT
BY Barnwell Q. King
ATTORNEY

3,088,018
Patented Apr. 30, 1963

3,088,018
CONSUMABLE ELECTRODE ARC WELDING
PROCESS AND APPARATUS
John W. Ross, Toronto, Ontario, and Ronald F. Turbitt, Downsview, Ontario, Canada, assignors to Union Carbide Canada Limited, Toronto, Ontario, Canada, a corporation of Toronto
Filed Jan. 29, 1960, Ser. No. 5,465
16 Claims. (Cl. 219—60)

This invention relates to electric arc welding, and more particularly to work-in-circuit circumferential welding of end-to-end annular joints in aligned pipe sections to form continuous overland pipe lines on location.

Pipe has been butt welded for a great number of years but many processes, including fusion welding, pressure welding, resistance welding, and flash welding. The majority of industrial butt welding of pipe was done manually by gas or electric fusion welding processes. But it is difficult and costly to obtain suitably qualified operators for manually welding pipe.

Up to the present time, however, there has not been available a commercially successful truly portable machine for fusion butt welding of pipe in all positions by the sigma (shielded-inert-gas-metal-arc) process without the need for flux coating or covering on the weld puddle. Most industrial piping installations and overland pipe lines require "all-position" welding. Mechanized circumferential all-position electric arc welding of pipe is difficult because of the problems of properly controlling the weld puddle during the 360° travel of the arc around the pipe joint. Such problems include resultant weld quality, penetration, and bead contour. The overall cost of labor poses another major problem.

The main object of this invention is to provide a consumable electrode-arc welding machine for pipe, that is compact and very light in weight compared to prior machines, yet substantially automatic in operation. With such machine pipe may be quickly welded in the field with a minimum of skilled labor.

Another important object is to provide a more efficient, effective and rapid consumable electrode-arc process of welding pipe sections in end-to-end relation to fabricate an overland pipe line in the field substantially faster and with much less work than has been possible in the past, with improved quality, resistance to corrosion, and mechanical properties of the welds.

Other important objects of the invention are as follows: to eliminate the necessity of a manually welded root pass; to avoid the necessity of weld backing rings or fixtures; to insure consistently uniform weld penetration regardless of ovality (out of roundness) and/or variations in relative wall thickness of the pipe being welded; to properly control the weld puddle in uphill as well as downhill travel of the electric arc around the pipe without the aid of slag or flux coverings on the puddle; to permit multi-pass welds to be made without changing the radial position of the welding head through which the fusible metal electrode is fed relative to the work corresponding with changes in electrode projection from root pass to finish pass; and to provide a weld puddle that will not run out of the joint as the welding operation progresses through at least 360° of travel of the electric arc around the joint.

Other objects will be clear to those skilled in the art from the following description.

According to the invention there is provided a portable machine for rotating an improved sigma welding head around a pipe joint, with the pipe in any fixed position. Such rotation of the head around the pipe is accomplished electrically-mechanically, with suitable speed controls to vary the speed of travel, depending on the type and size of the pipe being welded. In addition, means are provided to laterally adjust the position of the welding head with respect to a joint to be welded. In order to permit continuous as well as reverse rotation of the welding head, the torch, gas, power and control cables are continuously wound on and unwound from a reel effectively surrounding the pipe, which reel rotates with the welding head. Means are provided whereby the welding head rotation can be instantaneously reversed at any point without interrupting the welding arc, providing consistent bead contour, and greatly speeding up the welding cycle.

In order to utilize the improved welding technique of the present invention, very stable welding conditions are provided. Stable welding conditions are achieved by the use of an improved sigma welding torch having features which include spool-on-gun, self-contained wire feed motor, and which incorporates means for insuring positive electric welding current contact of a guide tube with the welding electrode-wire, and directionally accurate, positive and uniform electrode-wire feed.

A feature of the machine is that it can be used equally well either in shop or field. The torch also can be mounted in such a way that, with the machine attached to the pipe, the torch can travel around the pipe assembly to join fittings such as elbows, T's and flanges. The essential principles involved in the present machine and welding process make it suitable for the welding of pipe of most metals, such for example, as carbon steel, low and high alloy steels, and non-ferrous materials such as aluminum, copper and copper alloys, nickel and nickel alloys.

Figure 5A:
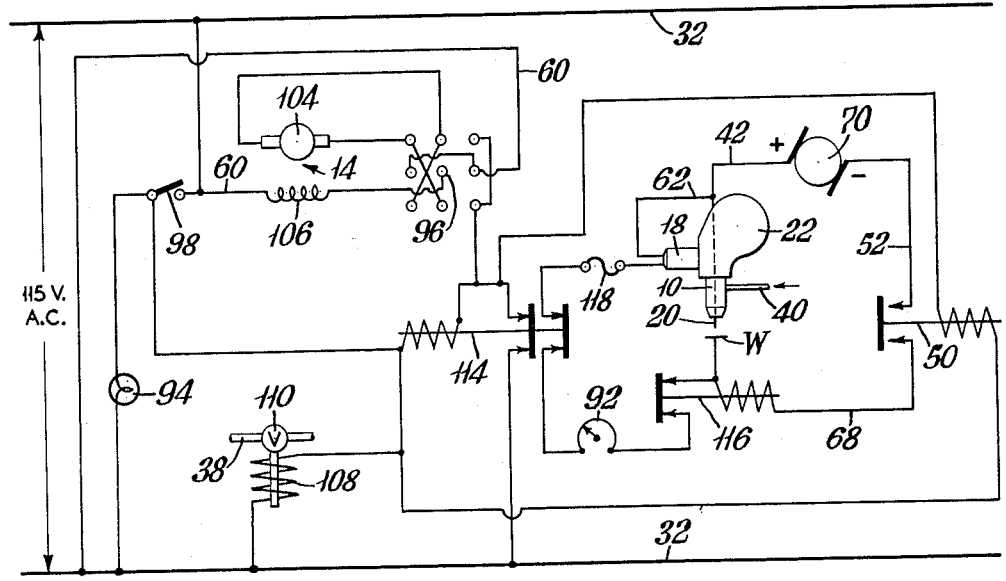
Figure 5B:
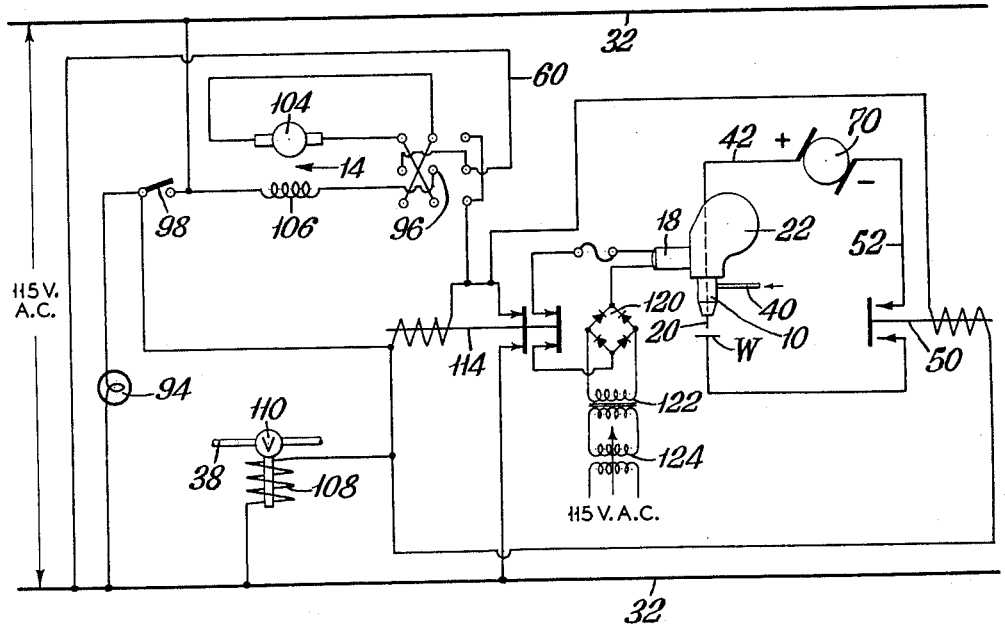
Figure 6:
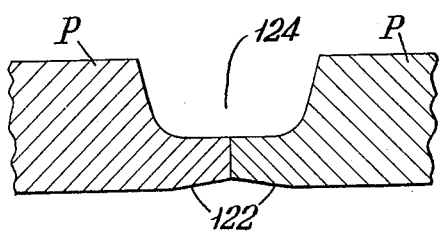
Figure 7:
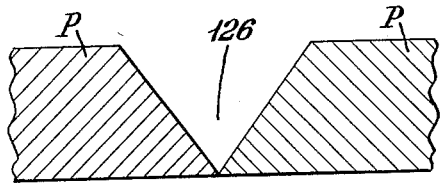
Figure 8:
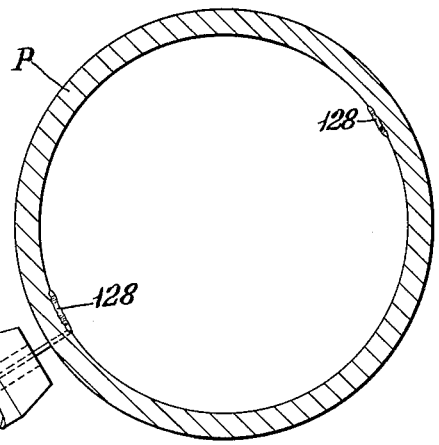
Figure 9:
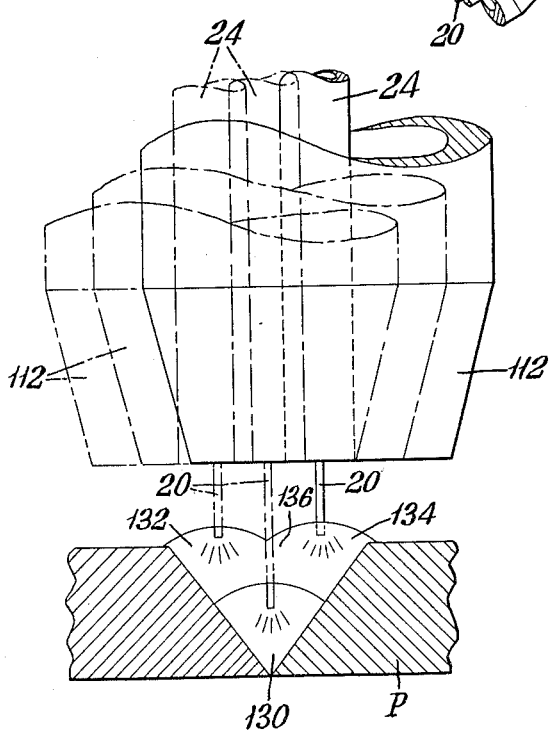

In the drawings:
FIG. 1 is a block diagram illustrating the invention for welding pipe of carbon steel and the like;
FIG. 2 is a block diagram illustrating a modification for welding pipe of aluminum and the like;
FIG. 3 is a fragmentary perspective view of the machine on a pipe that has just been welded according to the invention;
FIG. 4 is a view partly in elevation and partly in cross-section of the sigma welding head;
FIGS. 5a and 5b are wiring diagrams of the invention for, but not restricted to, welding aluminum and steel, respectively;
FIGS. 6 and 7 are enlarged fragmentary views in cross-section of joints prior to welding of aluminum and steel pipes, respectively;
FIG. 8 is an enlarged view mainly in cross-section of a pipe joint being welded by sigma torch which is shown in side elevation; and
FIG. 9 is an enlarged view in cross-section of a pipe joint showing how the torch, which is shown in front elevation is positioned to make the root pass and then moved from one side of the joint to the other to complete the weld in three passes.

Referring to the drawings, as shown in FIG. 1, for welding pipe according to the invention a sigma welding torch or gun 10 is mounted on a torch rotating machine 12 that is driven by a rotation motor 14 operated by a control box 16 that is mounted on the stationary part of such machine. Connected to the torch 10 is a wire feed motor 18 which pulls wire 20 from a wire spool 22 and feeds such wire through an electrical contact-tube 24 within the torch.

The wire feed motor is energized by a wire feed motor electrical supply 26 through conductors 28, 28. Such wire feed motor supply is, in turn, energized through a relay enclosure 30 provided with A.C. power input conductors 32, 32, and output conductors 34, 34 leading to the wire feed motor supply 26.

Arc shielding gas is conducted to the interior of welding torch 10 from a gas supply 36, such as a conventional cylinder of suitable gas under pressure, through a pipe 38 leading to the relay enclosure 30, and a flexible pipe 40 leading from such relay enclosure to torch 10. Electric welding current is supplied to the contact tube 24 of torch 10 through a D.C. power supply circuit including a flexible conductor 42 leading from a D.C. welding power supply 44 to such contact tube 24, and a flexible ground conductor 46 leading from the power supply 44 through conductor 52 to a welding contactor 50 and to the machine 12 by conductor 46 which is connected to the work 48 through feet represented by conductor 47.

The connections are such that the wire electrode 20 is positive (+) and the work negative (−), i.e., reverse polarity. The D.C. power supply 44 is energized through input conductors 54, 54 from a suitable source of A.C. power. The welding contactor 50 is connected to relay enclosure 30 by a conductor 56. The relay enclosure is connected to control box 16 by power lead 58 which, in turn, is connected to the rotation motor 14 by conductors 60, 60. Since the present invention is a truly gas shielded (sigma welding) process, no flux, solid or powdered, being used, there is no possibility for undesirable flux inclusions in the weld metal, which was a major source of defects in prior pipe welds.

In the modification of FIG. 2 the arrangement is similar to that of FIG. 1, except that the wire feed motor 18 is connected in parallel circuit relation with the welding arc by conductor 62, one end of which is electrically connected to the electrode contact-guide tube 24; and by conductor 64 which leads through relay enclosure 66 to conductor 68 which, in turn, is connected to the power supply 70. Other differences are explained in detail below in the description of FIG. 5b.

Referring to FIG. 3, the sigma welding machine M is shown mounted on a pipe P that has been circumferentially sigma welded at B according to the invention. Briefly, the machine M comprises an inverted U-shaped frame or saddle 72 provided with feet, not shown, resting on the upper surface of pipe P. The saddle is held in place on the pipe by spring clips such as boomer chain assemblies 74, 74 comprising manually releasable clamps 75, 75, which are known to those skilled in the art. Mounted on the upper surface of saddle 72 are longitudinal parallel tracks, not shown, on which a carriage 76 is mounted for manual adjustment longitudinally of pipe P by suitable means including knob 78. Also mounted on carriage 76 is the control box 16 which is electrically connected to the relay enclosure by cable 58.

Secured to one end of carriage 76 is a service cable reel 80 to the outer side of which is attached a sigma welding head H. The reel 80 is provided with an internal gear, not shown, which is driven by the rotation motor 14 mounted on carriage 76 through a coupling 82 and two arcuately spaced, commonly driven pinion gears, not shown, adapted to mesh with said internal gear. Such arc spacing is greater than the arcuate gap between the ends of the internal gear so that at least one of such pinion gears is always in driving relation therewith. Reel 80, as well as the internal gear, is in the form of a horseshoe so that the same can be mounted on the pipe for revolving about the center of the latter as an axis, and removed from the pipe after the weld has been completed.

The head H includes sigma welding torch 10, wire feed motor 18 and a suitable housing 86 within which is disposed the electrode wire spool that can be viewed through a window 88 provided for this purpose in the wall of housing 86. Leading to the welding head H are flexible service cables including gas hose 40, electric power lead 42, and a cable 90 comprising wire feed motor conductors 28, 28, FIG. 1; and conductor 64, FIG. 2.

It will be understood that welding head H may be located between the reel and the carriage, rather than on the outside of the reel as shown in FIG. 3. This is particularly important in the welding of extruded pipe which may have large variations in wall thickness.

Mounted on the front of control box 16 is an emergency stop switch 91, a wire speed control 92, a pilot light 94, and a master switch 96. Extending from the top of the control box 16 is a limit switch 98 which is positioned in the path of a cam 100 of the speed control knob 102 of the rotation motor 14 for eliminating the arc crater upon completion of the weld.

As an example of the operation of the sigma pipe welding machine, referring particularly to FIG. 5a, in the case of aluminum pipe, for example the welding head H is positioned at a desired circumferential location with respect to pipe P, FIG. 3, by operating master switch 96. Moving the switch upwardly closes a supply circuit to armature 104 and field 106 of the rotation motor 14, including conductors 60, 60 and power supply leads 32, 32. This operation causes the motor 14 to drive the reel 80 and head H in one direction about the pipe P. Moving switch 96 downwardly closes a circuit which causes motor 14 to drive the reel 80 and head H about the pipe in the opposite direction.

Assuming the head has been so properly positioned with respect to the circumference of pipe P, electrode wire 20, FIG. 4, is inched toward the pipe P to make contact therewith by operating manually adjustable inching knob 106. Limit switch 98, FIG. 5a, is then closed energizing pilot light 94 and solenoid 108 of arc shielding gas supply valve 110 in conduit 38, such solenoid and valve being located within relay enclosure 30. This results in gas being fed to the interior of torch 10, FIG. 4, around the contact-guide tube 24 and out of the nozzle 112 in an annular stream about the end of electrode wire 20.

Welding power supply 70 is then turned on and switch 96 is closed causing welding contactor 50 to close and results in welding power being supplied to energize an arc between the end of the electrode wire 20 and work W, pipe P, through a circuit including conductors 42, 52 and 68.

Upon closure of switch 96 a welding start relay 114 closes; and weld current relay 116 closes as a result of the flow of arc welding current. Wire feed motor 18 is thereby energized through a circuit including conductors 62, fuse 118 and wire feed-speed control rheostat 92, motor 18 being energized by power supply 70 in parallel relation with the welding arc.

The following operating conditions are typical for carrying out the invention in welding pipe composed of aluminum:

Current: 200–210 amps. DCRP.
Travel: 90–120 i.p.m. linear travel on surface of pipe.
Voltage:
    Root 18 volts.
    Cover 20½ volts.
Tip/work dist.: 5/16"–3/8".
Wire: 0.035" C54S aluminum.
Gas: Argon 25–45 c.f.h.
Power supply: Conventional D.C.
Cleaning: Preweld clean by wire brushing (preferably stainless steel). May also use wiping rags and/or alcohol, to remove mud, and moisture.
Fixturing: Weld joint backing and alignment.
Welding sequence:
    0.188" wall 2"–4" pipe—start at 7 o'clock.
    0.188" wall 4"–8" pipe—start at 12 o'clock.
    Passes 1 and 2 forward.
    Passes 3 and 4 reverse.

A feature of the circuit of FIG. 5a is that the welding arc is not interrupted when master switch 96 is in its neutral position. Thus, rotation of the welding head about the pipe can be instantaneously reversed without interruption of the welding action by simply throwing switch 96 from one closed position to the other. The arc action is terminated by opening switch 98 when cam 100, FIG. 3, operates such switch. The effective arc lengths can be preset, or adjusted during the welding operation, through adjustment of the rheostat 92 which controls the relative speed of wire feed motor 18. The wire feed speed of motor 18 is automatically controlled by the voltage across the welding arc between the end of wire electrode 20 and work W.

Referring to FIG. 5b, the wire feed motor 18 is energized from a separate source of supply comprising a rectifier 120 that is in turn energized by a transformer 122 connected to an adjustable auto transformer 124, as an example. In this case the speed of the wire feed motor is regulated by adjusting the auto transformer 124. The circuit of FIG. 5b is preferred for welding carbon steel pipe.

The following example sets forth typical operating conditions for welding pipe composed of carbon steel according to the invention:

Current: 115–150 amps. DCRP.
Travel:
    Root 8–10 i.p.m.
    Cover 10–14 i.p.m.
Voltage: 18–19 volts.
Tip/work dist.: $5/16''-3/8''$.
Wire: 0.030'' carbon steel.
Gas: 50/50 argon/$CO_2$ or 5% oxy-argon/$CO_2$, 50 c.f.h.
Power supply: Constant potential with slope control.
Cleaning: Light wire brush to remove lint or mud.
Welding sequence: 2 tack welds 180 degrees apart at 8 o'clock and 2 o'clock—complete penetration; min. filler addition, $3/8''-1/2''$ long. Passes 1 and 2 forward. Pass 3 reverse.

In connection with the welding of aluminum pipe according to the invention, a typical joint is shown in FIG. 6 wherein the parts to be welded are provided with shaped flanges 122 which result in a conventional U-shaped groove opening outwardly when the parts are assembled in abutting relation. In this case the welding arc is started in an annular stream of arc shielding gas composed of argon between the end of a wire electrode 20 and joint 124. By means of the welding head the electrode, gas stream and the arc are continuously rotated as a unit in a predetermined direction around such joint at a constant speed while simultaneously feeding the electrode in a radial direction toward the joint to make a root pass in the bottom of the groove. The arc is then shifted to one side of the center of the groove while continuing such rotation without interruption of the process until one half of the joint is filled, and then shifting the arc to the other side of the center of the groove while continuing such rotation without interruption of the process until the other half of the joint is filled, completing the weld in continuous revolutions of the arc.

In the case of welding carbon steel pipe according to the invention, an open V-groove 126 is provided between the abutting sections of the pipe to be welded, as shown in FIG. 7. The pipe sections are fixed in end-to-end abutting relation with each other by tack welds 128, 128, 180° apart, one of which is located at the 8 o'clock position. The welding arc is started in an annular stream of arc shielding gas composed of about equal parts of $CO_2$ and argon at the tack weld at the 8 o'clock position between the end of wire electrode 20 and joint 126. The electrode, gas stream and arc are rotated as a unit in a clockwise direction upwardly and then downwardly completely around the joint 126 at a constant speed while the electrode is simultaneously fed in a radial direction toward the joint to make a 360° root pass 130, FIG. 9, in the bottom of the groove.

The arc is then shifted to one side of the center of the groove at the 8 o'clock position while such clockwise rotation is continued without interruption of the process again completely around the pipe until one half of the joint is filled with a 360° intermediate pass 132. At such point the arc is again shifted to the other side of the center of the groove at such 8 o'clock position while continuing such clockwise rotation without interruption of the process and again completely around the pipe until the other half of the joint is filled with a 360° finish pass 134. Thus, the weld 136, for example, is completed in 3 continuous uninterrupted revolutions of the arc clockwise around the pipe P.

The foregoing example in the case of welding steel pipe according to the invention is but one way of accomplishing the invention in which a relatively fixed distance is maintained between the end of the electrode guide tube 24 in the torch and the original work regardless of the number of overlapping passes made in such work. While in such case the direction of the travel of the torch is not changed during the welding operation, another example of the invention is accomplished by reversing the direction of travel of the torch instantaneously at the end of each pass without any interruption of the arc.

For example, satisfactory welds in steel pipe have been made according to the invention by starting at the 6 o'clock position, carrying the weld upwardly to the 12 o'clock position, instantaneously reversing the welding action and carrying it first downwardly, around under the joint, and then upwardly completely around the pipe through two complete revolutions; then instantaneously reversing the welding action at the 12 o'clock position and carrying the operation downwardly to the final 6 o'clock position. In such case while the arc is instantaneously reversed in its previous direction of rotation, neither the welding action nor the arc itself is interrupted. This example is preferred for carrying out the invention in welding carbon steel pipe, inasmuch as in this case a gap is not necessary as in the case where the welding action continues around the pipe for at least 360° in making the root pass, which requires that the downhill portion of the joint be suitably gapped.

A feature of the present invention is the substantial improvement of the welding head, including the torch, electrode feeding mechanism and supply spool arrangement. The spool 22 from which wire 20 is fed toward the torch is located so that the natural set of the wire is such that it always contacts the inner surface of guide tube 24 at a predetermined point near its exit from such tube. This not only provides a good and constant sliding electrical contact with the interior of such tube, but guides the end of wire 20 always in the same direction as it leaves the torch. Such direction is preferably parallel to that of the movement of the torch as the head revolves about pipe being welded.

The wire feed motor 18 drives the wire 20 through feed rollers 136, which are mounted in outboard bearings 138 for the purpose of avoiding wobble or eccentricity of the feed roll. This results in a wire feed that is consistently stable throughout the welding operation, which greatly contributes to the success of the operation.

What is claimed is:

1. Work-in-circuit multi-pass sigma welding with a sigma welding torch provided with an electrode contact-guide tube, which comprises maintaining a relatively fixed distance between the end of the electrode contact-guide tube in such torch and the original work regardless of the number of overlapping passes made on such work, in which the direction of travel of the torch is instantaneously reversed at the end of each pass without any interruption of the arc.

2. Work-in-circuit sigma welding circumferential joints which comprises starting the welding operation at a predetermined clock position and advancing the operation through a predetermined arc of travel in one direction about such joint, instantaneously reversing the direction of travel of the operation without any interruption of the welding arc at the end of such arc travel, continuing the operation in such reversed direction of travel through a predetermined arc of travel and thereupon instantaneously reversing the direction of travel of the operation and continuing the latter until the weld is completed.

3. Work-in-circuit sigma welding which comprises instantaneously reversing the direction of travel of the welding operation without any interruption of the arc.

4. A portable machine for circumferentially sigma welding pipe, which comprises a frame adapted to rest on the pipe to be welded, a transverse track on said frame, a carriage adjustably mounted on said track, a sigma welding head and electrode wire supply spool and a service cable reel mounted on a revolving unit rotatable on one end of said carriage, a drive motor mounted on said carriage for revolving said unit, and flexible service cable connected to said head adapted to wind on and unwind from said reel as said unit revolves around said pipe.

5. Process of welding circumferential joints in substantially horizontally positioned pipe, which comprises securing the pipe parts to be welded in abutting relation, continuously sigma welding completely around the pipe a root pass in such joint without the use of any solid or powdered flux composition, to provide an initial weld bead that is fully penetrated, free of undesirable flux inclusions and with a clean outside weld surface that is suitable to directly receive additional weld passes without the need for interpass weld surface cleaning, and thereupon sigma welding such additional passes as may be needed to complete the weld, the complete multi-pass welding operation being accomplished without interruption of the welding arc.

6. Work-in-circuit electric arc welding pipe circumferentially with current that flows through such pipe and a fusible wire electrode that is continuously fed toward a gas-shielded arc energized by such current, which comprises securing the pipe sections to be welded in fixed end-to-end abutting relation with each other to provide a joint therebetween, starting the welding arc in an annular stream of arc shielding gas between the end of such wire electrode and such joint, rotating such electrode, gas stream and arc as a unit in one direction around such joint at a constant speed while simultaneously feeding the electrode in a radial direction toward the joint to make a root pass, then shifting the arc to one side of the center of the point, while continuing such rotation without interruption of the process until one-half of the joint is filled, and shifting the arc to the other side of the center of the joint, while continuing such rotation without interruption of the process until the other half of the joint is filled, thereby completing the weld in continuous revolutions of the arc around the pipe, while the wire electrode is continuously fed in a radial direction toward the longitudinal axis of such pipe, and while such annular stream of arc shielding gas flows continuously about the so-fed wire electrode to shield the arc and adjacent weld metal from atmospheric contamination.

7. Work-in-circuit electric arc welding pipe circumferentially with reverse polarity-direct current that flows through such pipe and a fusible wire electrode that is continuously fed toward a gas-shielded arc energized by such current, which comprises securing the pipe sections to be welded in fixed end-to-end abutting relation with each other to provide an outwardly open joint therebetween, starting the welding arc in an annular stream of arc shielding gas between the end of such wire electrode and such joint, rotating such electrode, gas stream and arc as a unit completely around such point at a constant speed while simultaneously feeding the electrode in a radial direction toward the joint to make a root pass in the bottom of such joint, then shifting the arc to one side of the center of the joint and rotating such unit completely around such joint without interruption of the process until one-half of the joint is filled, and then shifting the arc to the other side of the center of the joint and rotating such unit completely around the joint without interruption of the process until the other half of the joint is filled, thus completing the weld in three passes of the arc around the pipe, while the wire electrode is continuously fed in a radial direction toward the longitudinal axis of such pipe, while such annular stream of arc shielding gas flows continuously about the so-fed wire electrode to shield the arc and adjacent weld metal from atmospheric contamination.

8. A pipe welding machine for work-in-circuit electric arc welding pipe circumferentially with current that flows through such pipe and a fusible wire electrode that is continuously fed toward a gas-shielded arc energized by such current, the pipe sections to be welded being fixed end-to-end abutting relation with each other to provide a joint therebetween, comprising electric circuit means including a sigma welding torch for starting the welding arc in an annular stream of arc shielding gas between the end of such wire electrode and such joint, means for continuously rotating such electrode, gas stream and arc as a unit in either direction around such joint at a constant speed, means for simultaneously feeding the electrode and discharging such annular stream of gas in a radial direction through said torch toward the joint to make a root pass in the bottom of such joint, means for shifting the arc with respect to the center of the joint, and means for reversing the direction of rotation of the unit without interruption of the arc while the wire electrode is continuously fed through said torch in a radial direction toward the longitudinal axis of such pipe and while such annular stream of arc shielding gas flows continuously from said torch about the so-fed wire electrode to shield the arc and adjacent weld metal from atmospheric contamination.

9. A pipe welding machine as defined by claim 8, provided with means for maintaining said torch in a circular path having a constant radius centered on the longitudinal axis of such pipe being so-welded throughout the several passes as the torch revolves around the joint.

10. A pipe welding machine as defined by claim 8, provided with a flexible supply cable means connected to said unit and a reel surrounding the pipe being so-welded for winding said flexible supply cable thereon as the unit revolves in one direction in welding about such pipe, and unwinding such cable means as the unit revolves in welding in the opposite direction.

11. Work-in-circuit mechanized sigma welding of pipe circumferentially, which comprises mechanically advancing the welding operation completely around the joint at a substantially uniform speed while simultaneously feeding at a controlled rate a bare fusible metal electrode surrounded by an annular stream of weld shielding gas toward such joint to provide a continuous annular weld in such pipe, reeling supply cables on a reel which revolves with said welding operation about the pipe, and revolving an electrode supply spool with said welding operation about the pipe.

12. Work-in-circuit mechanized sigma welding of pipe circumferentially as defined by claim 11, in which the bare fusible metal electrode is fed at a controlled rate toward the arc through a contact-guide tube, the weld puddle is free of any flux or slag covering, and the supply spool of such fusible metal electrode is maintained in a relative position such that the natural set in the fusible metal electrode supplied therefrom acts to maintain constant electrical contact with such contact-guide tube through which the electrode is fed toward said arc.

13. Work-in-circuit multi-pass mechanized sigma welding pipe with a sigma welding torch provided with an electrode contact-guide tube, which comprises mechanically advancing the welding operation completely around the joint at a substantially uniform speed while simultaneously feeding at a controlled rate a bare fusible metal electrode surrounded by an annular stream of weld shielding gas toward such joint to provide a continuous annular weld in such pipe, and mechanically maintaining a relatively fixed distance between the end of the electrode contact-guide tube in such torch and the original work regardless of the number of overlapping passes made on such work.

14. A portable machine for circumferentially sigma welding elongated pipe in any position, which comprises a frame including a saddle adapted to be mounted on the pipe to be welded with said saddle straddling such pipe, a sigma welding head mounted on said frame for adjustment longitudinally of such pipe, said sigma welding head including a sigma welding torch provided with a wire-electrode contact-guide tube, means for feeding a wire-electrode through said tube toward the pipe, and a gas-nozzle surrounding said tube for discharging an annular stream of shielding gas around the end of such wire electrode, means for revolving said head around such pipe, means including supply cables for such torch, and a reel for reeling such supply cables as the said head revolves about the pipe.

15. A portable machine for circumferentially sigma welding pipe, which comprises a frame adapted to be mounted on pipe to be welded, a sigma welding head mounted on said frame for adjustment longitudinally of such pipe, said sigma welding head including a sigma welding torch provided with a wire-electrode contact-guide tube, means for feeding a wire-electrode through said tube toward the pipe, and a gas-nozzle surrounding said tube for discharging an annular stream of shielding gas around the end of such wire electrode, means for rotating said head around such pipe, a wire supply spool mounted for rotation as a unit with said welding head around said pipe, and a service cable reel mounted effectively around such pipe for rotation as a unit with said head about such pipe.

16. A portable machine for circumferentially sigma welding pipe, which comprises a frame adapted to be mounted on pipe to be welded, a sigma welding head mounted on said frame for adjustment longitudinally of such pipe, said sigma welding head including a sigma welding torch provided with a wire-electrode contact-guide tube, means for feeding a wire-electrode through said tube toward the pipe, and a gas-nozzle surrounding said tube for discharging an annular stream of shielding gas around the end of such wire electrode, means for rotating said head around such pipe, a wire electrode supply spool mounted for rotation as a unit with said welding head around said pipe, a service cable reel mounted effectively around such pipe for rotation as a unit with said head axially about such pipe, and electrical means for controlling the welding operations mounted on said machine.

References Cited in the file of this patent

UNITED STATES PATENTS

| | | |
|---|---|---|
| 1,949,251 | Gilbert | Oct. 27, 1934 |
| 2,013,630 | Goldsborough | Sept. 3, 1935 |
| 2,777,937 | Bryant | Jan. 15, 1957 |
| 2,795,689 | McNutt | June 11, 1957 |
| 2,812,419 | Chyle | Nov. 5, 1957 |
| 2,874,263 | Williams et al. | Feb. 17, 1959 |
| 2,894,111 | McNutt | July 7, 1959 |
| 2,960,597 | Bruno | Nov. 15, 1960 |

OTHER REFERENCES

"Oil and Gas Journal," volume 52, March 15, 1954; pages 79–80.

"Oil and Gas Journal," volume 53, August 30, 1954; pages 110–111.

"Welding Journal," September 1959; pages 876–884.